US008967348B2

(12) United States Patent
Mikonaho et al.

(10) Patent No.: US 8,967,348 B2
(45) Date of Patent: Mar. 3, 2015

(54) MASS DAMPER

(75) Inventors: Heikki Mikonaho, Turku (FI); Hannu Tienhaara, Turku (FI); Peter Andersson, Vtt (FI); Paul Klinge, Vtt (FI); Petteri Kokkonen, Vtt (FI); Hannu Sainio, Vtt (FI)

(73) Assignee: Wärtsilä Finland Oy, Vaasa (FI)

( * ) Notice: Subject to any disclaimer, the term of this patent is extended or adjusted under 35 U.S.C. 154(b) by 34 days.

(21) Appl. No.: 13/982,994

(22) PCT Filed: Nov. 23, 2011

(86) PCT No.: PCT/FI2011/051029
§ 371 (c)(1),
(2), (4) Date: Sep. 19, 2013

(87) PCT Pub. No.: WO2012/104470
PCT Pub. Date: Aug. 9, 2012

(65) Prior Publication Data
US 2014/0008163 A1    Jan. 9, 2014

(30) Foreign Application Priority Data

Jan. 31, 2011  (FI) .................................... 20115091

(51) Int. Cl.
*F16F 7/104*  (2006.01)
*F16F 7/10*  (2006.01)

(52) U.S. Cl.
CPC .............. *F16F 7/104* (2013.01); *F16F 7/1011* (2013.01)
USPC ......................................... 188/380; 267/136

(58) Field of Classification Search
CPC ............ F16F 7/104; F16F 7/108; F16F 7/116

USPC ........ 188/378–380; 267/136, 137; 244/17.13, 244/17.27, 54, 173.2; 248/550, 562
See application file for complete search history.

(56) References Cited

U.S. PATENT DOCUMENTS

| | | | | |
|---|---|---|---|---|
| 2,838,137 | A | * | 6/1958 | Wallerstein, Jr. ............. 188/380 |
| 3,536,165 | A | * | 10/1970 | Desjardins .................... 188/380 |
| 3,586,309 | A | * | 6/1971 | Freibauer ...................... 267/136 |
| 4,935,651 | A | | 6/1990 | Hong et al. |
| 6,035,981 | A | * | 3/2000 | Kemeny ........................ 188/379 |
| 2006/0175169 | A1 | | 8/2006 | Or et al. |

FOREIGN PATENT DOCUMENTS

| | | |
|---|---|---|
| FI | 117 573 B1 | 11/2006 |
| FI | 119519 B | 12/2008 |
| GB | 2 265 669 A | 10/1993 |
| JP | 60-060344 A | 4/1985 |
| JP | 2 066336 A | 3/1990 |
| JP | 8 041819 A | 2/1996 |
| JP | 2001317586 A | 11/2001 |
| WO | WO 2010/053933 A1 | 5/2010 |

* cited by examiner

*Primary Examiner* — Christopher Schwartz
(74) *Attorney, Agent, or Firm* — Muncy, Geissler, Olds & Lowe, P.C.

(57) ABSTRACT

A tuned mass damper comprising a frame, at least one bendable spring element being connected from its ends to the frame, and at least one mass element being connected to the spring element at a distance from the ends of the spring element, at least one movable spring support element for adjusting the tuning frequency of the damper, and means for moving the spring support element.

12 Claims, 4 Drawing Sheets

MASS DAMPER

TECHNICAL FIELD OF THE INVENTION

The present invention relates to an adaptive tuned mass damper according to the preamble of claim 1.

BACKGROUND OF THE INVENTION

Vibrations are a common problem in many machines comprising reciprocating or rotating parts. Vibrations occur for instance in internal combustion engines or in the auxiliaries of them, such as in turbochargers. Vibrations can be reduced by modifying the components, for instance by increasing the stiffness of some parts of the structure. However, this is not always possible or practical for instance because of cost-efficiency reasons. Therefore, different vibration dampers have been developed for reducing vibrations of machines or machine parts. A vibration damper can be implemented as a tuned mass damper, an adaptive tuned mass damper, a semi active damper, or an active damper. A typical mass damper comprises a spring-supported movable mass that can move in a space that is filled with a damping medium, such as gas or liquid. The kinetic and pressure energy of the damping medium is converted into thermal energy and the motion of the mass element and thus also the vibration of the component to which the mass damper is attached is dampened. In a tuned mass damper the tuning frequency cannot be adjusted during use, whereas in an adaptive tuned mass damper the tuning frequency can be adjusted also during use. Adaptive tuned mass dampers can thus be used to dampen vibrations caused by different modes of vibration. In active dampers external force is produced instead of or in addition to the vibrations of the mass element.

Patent FI 117573 B discloses a mass damper comprising a vibration element being arranged inside a chamber that is filled with damping medium, such as gas or liquid. The vibration element is supported by springs to the ends of the chamber and can reciprocate in the direction of a linear guide that is arranged inside the chamber. The vibration element consists of several parts for enabling easier adjustment of the mass damper. Also the damping medium flow in the damper can be adjusted for changing the damping properties. Although the damping properties of the mass damper disclosed in patent FI 117573 B can be adjusted to some extent, changing of the tuning frequency is not possible during the use of the damper.

SUMMARY OF THE INVENTION

The object of the present invention is to provide an improved adaptive tuned mass damper. The mass damper according to the present invention is characterized by the characterizing part of claim 1.

According to the present invention, the tuned mass damper comprises a frame, at least one bendable spring element being connected from its ends to the frame, and at least one mass element being connected to the spring element at a distance from the ends of the spring element, at least one movable spring support element, and means for moving the spring support element in the longitudinal direction of the spring element for adjusting the tuning frequency of the damper. The movable spring support elements enable easy adjustment of the tuning frequency of the mass damper also during the use without a need of dismounting the mass damper. Since the spring elements are connected from the both ends to the frame, a robust structure that is also suitable for larger mass dampers is achieved.

According to an embodiment of the invention, the movable spring support elements are rollers being arranged on both sides of the spring elements in the vibration direction of the mass damper. Rollers can have a simple construction and they can carry large forces.

According to an embodiment of the invention, the means for moving the movable spring support elements is a moving element that is parallel to the vibration direction of the mass damper and movable in the longitudinal direction of the spring elements. This is a simple but reliable design for moving the support elements.

According to an embodiment of the invention, the moving element comprises apertures being arranged around the ends of the movable spring support elements. The apertures allow movements of the movable spring support elements in the vibration direction of the mass damper, and no separate elements are needed for connecting the movable spring support elements to the moving element.

According to an embodiment of the invention, the moving element is attached to a lead screw and the mass damper comprises means for rotating the lead screw. This construction is simple and reliable and can be fitted in a small space.

According to an embodiment of the invention, the spring elements are connected to the frame with second spring support elements located on both sides of the spring elements in the vibration direction of the mass damper and being wedged between the spring element and a recess in the frame. With this support construction a suitable pre-load can be applied to the second spring support elements.

According to an embodiment of the invention, the parts of the frame parallel to the vibration direction of the mass damper are resilient for allowing displacement of the fixing points of the spring elements. When the mass elements move, a force pointing inwards is directed at the fixing points of the spring elements. If the frame of the mass damper is made resilient, the tension in the spring elements can be reduced.

According to an embodiment of the invention, the mass elements are provided with recesses for accommodating the movable spring support elements. This embodiment enables small size of the mass damper and simple structure of the movable spring support elements.

According to an embodiment of the invention, the mass elements are connected to each other with at least one stud bolt. According to another embodiment of the invention, spring pins are arranged between the mass elements for preventing movements of the mass elements in relation to each other in the longitudinal direction of the spring elements. According to another embodiment of the invention, springs are arranged between the mass elements that are around the spring elements. With the stud bolts and springs between the mass elements, the mass elements can be firmly connected to each other so that vibrations of the mass elements against each other can be prevented. Also the preload of the movable spring support elements is controlled by the pretensioning of the stud bolts and the properties of the springs between the mass elements. Spring pins between the mass elements prevent transverse movements of the mass elements in relation to each other.

According to an embodiment of the invention, the mass damper comprises at least one linear guide supporting the mass elements and allowing movements of the mass elements in the vibration direction of the mass damper. This is beneficial especially in larger mass dampers. The linear guide carries forces that act in other directions than the vibration direction and the spring elements need therefore carry forces in one direction only.

According to an embodiment of the invention, the linear guide is used to tighten the frame of the mass damper. When the linear guide works as a tightening element of the frame of the mass damper and carries part of the forces that are directed at the mass damper, other parts of the frame can be designed more freely. The linear guide both tightens the frame ends with preload and acts as a guiding element for the mass elements.

DETAILED DESCRIPTION OF THE INVENTION

Figure 1:
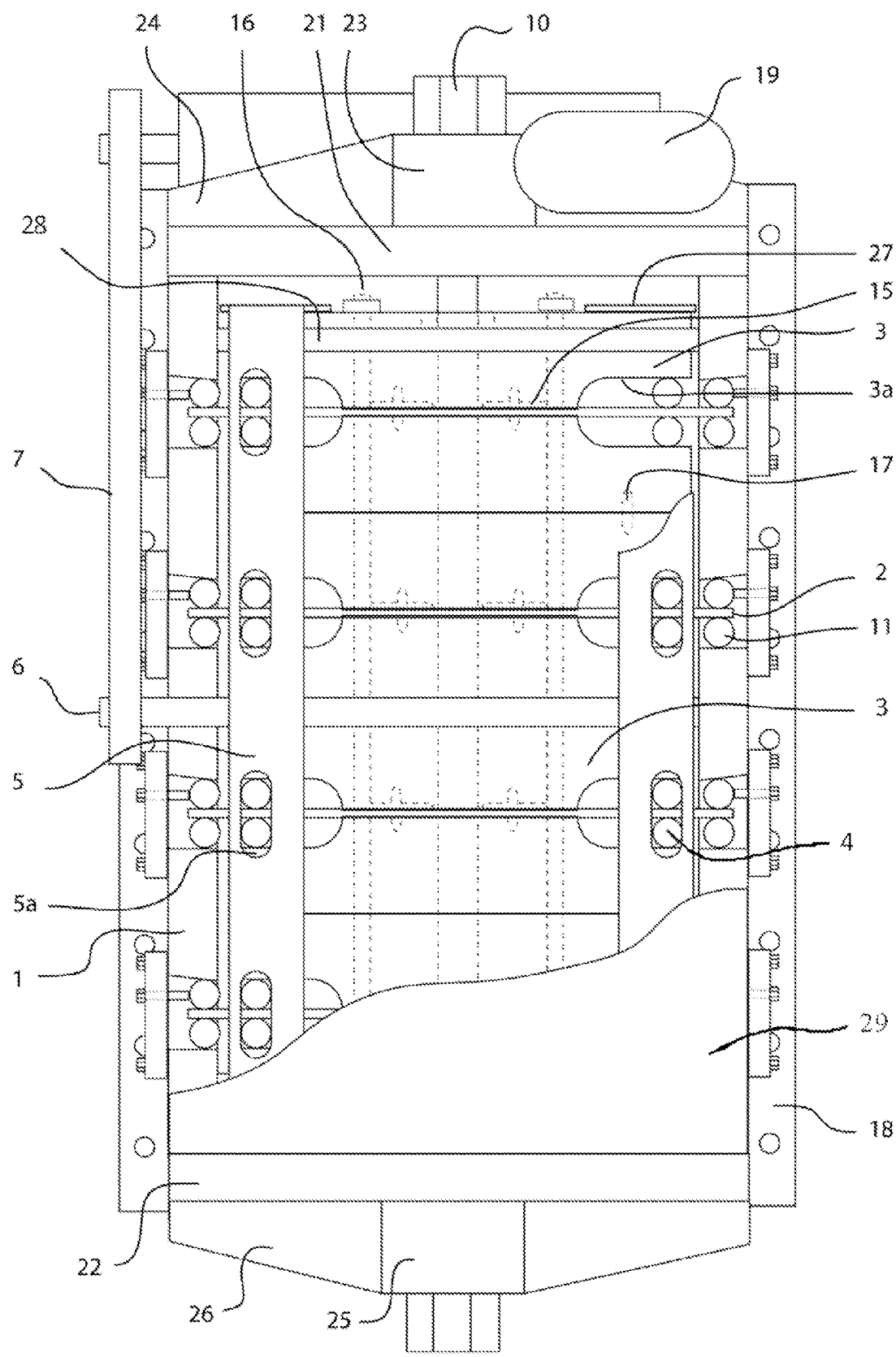
FIG. 1 shows a simplified illustration of a mass damper according to an embodiment of the present invention.
Figure 2:
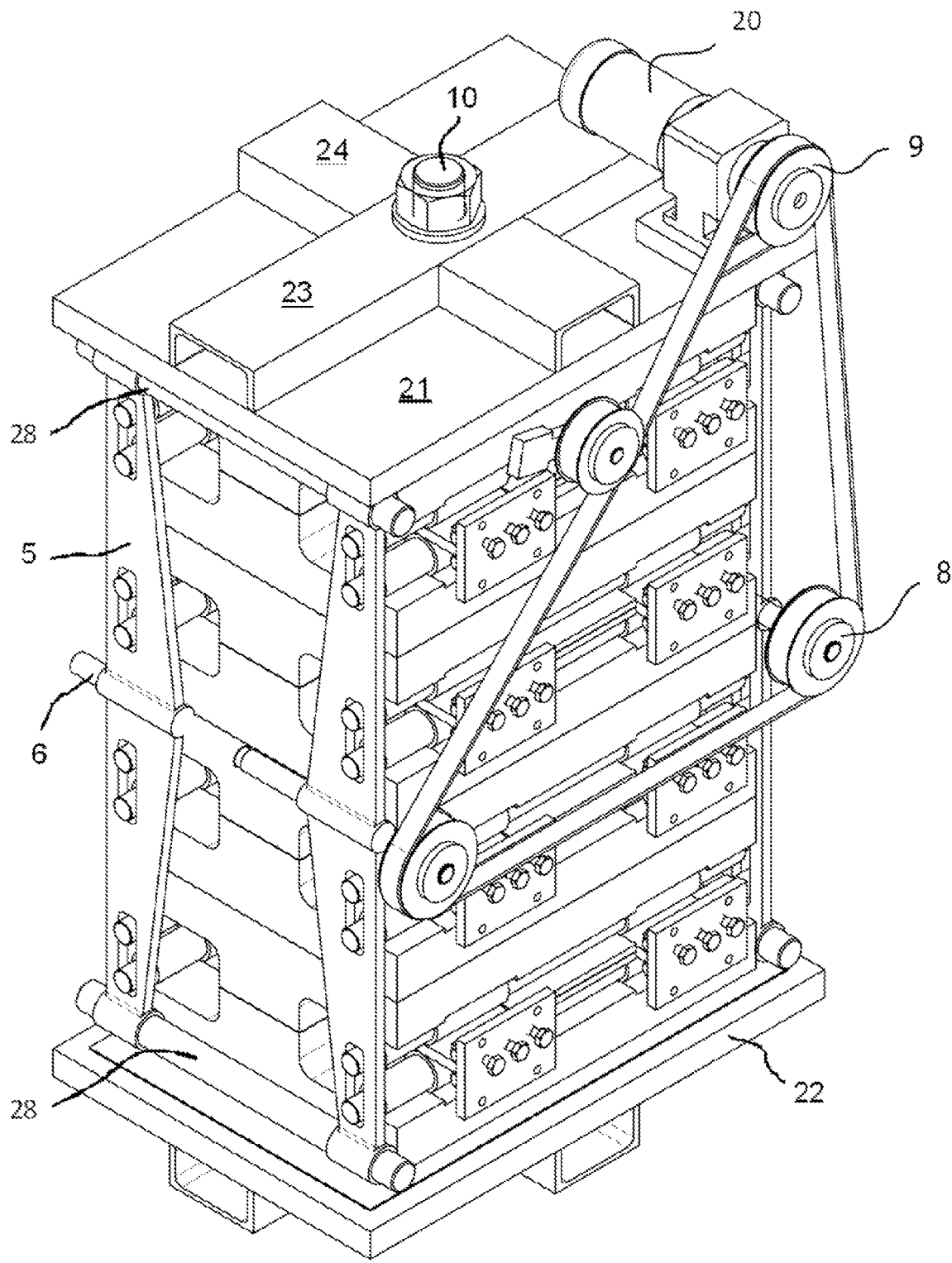
FIG. 2 shows the mass damper of FIG. 1 from another angle without the casing of the damper.
Figure 3:
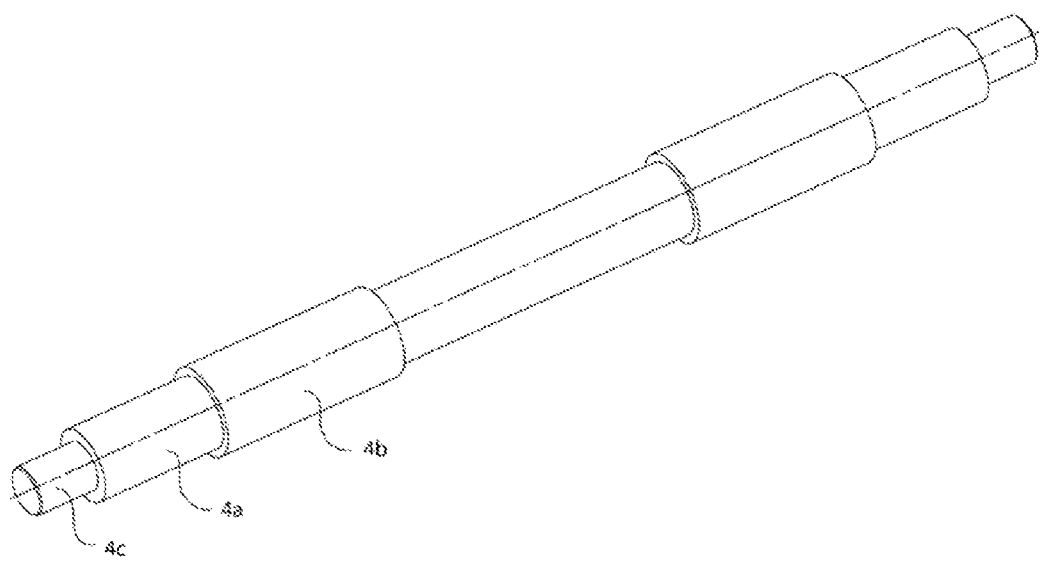
FIG. 3 shows a movable spring support element.
Figure 5:
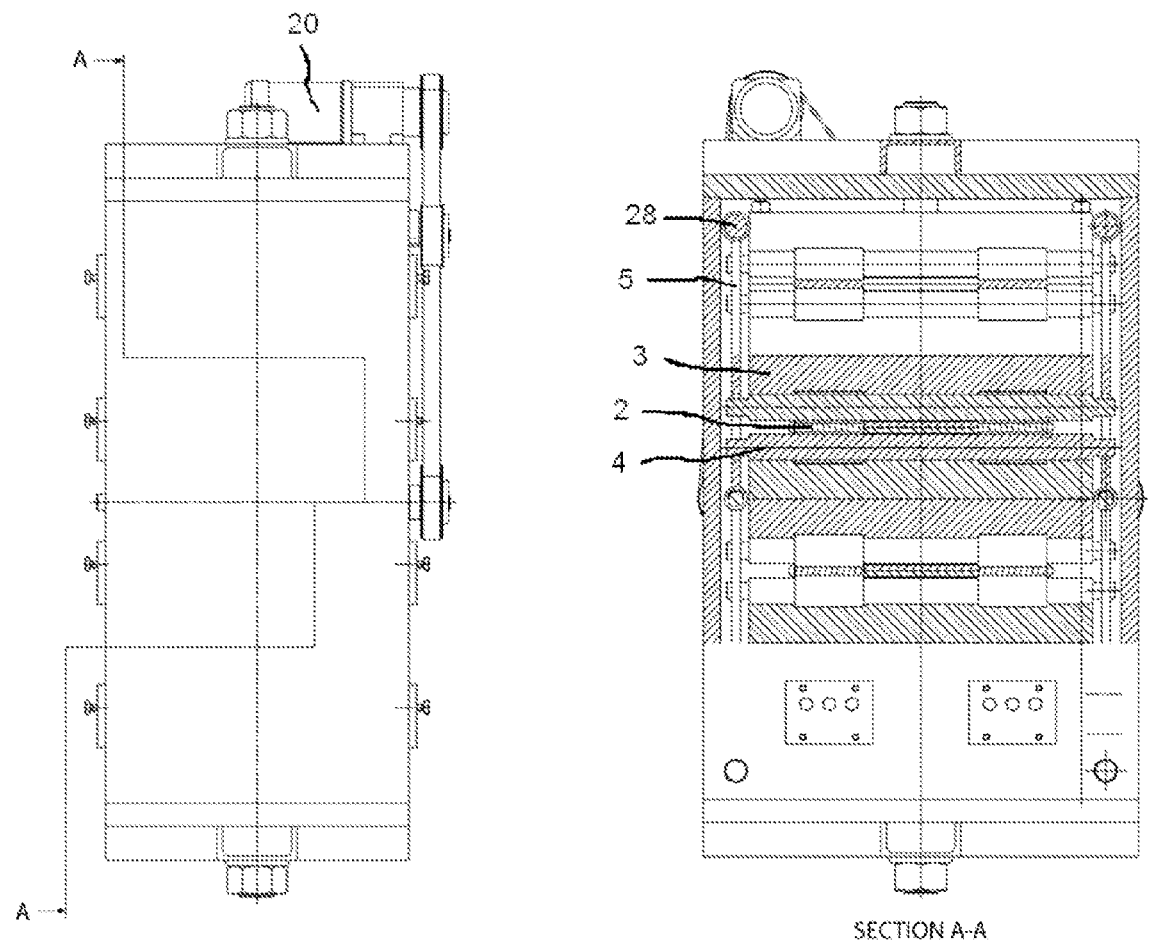
FIG. 5 shows a partially cross-sectional view of the mass damper.

Embodiments of the invention are now described in more detail with reference to the accompanying drawings.

An adaptive tuned mass damper according to the present invention comprises a frame 1, at least one spring element 2, at least one mass element 3, and at least one movable spring support element 4. The spring element 2 is connected from its ends to the frame 1. The mass damper is intended for reducing vibrations of for instance an internal combustion engine, a turbocharger of an internal combustion engine, or some other vibrating device. In the embodiment of FIGS. 1-5, the mass damper comprises a plurality of spring elements 2, movable spring support elements 4 and mass elements 3. The spring elements 2 are leaf springs that are arranged inside the frame 1 so that both ends of the spring elements 2 are fixed to the frame 1. The term 'leaf spring' refers here to springs that can consist either of a single elongated resilient element or a plurality of elements arranged on top of each other. The mass elements 3 are arranged as a stack forming a vibration element. Mass elements 3 are arranged around the spring elements 2 so that there are two parallel spring elements 2 between a pair of mass elements 3. The mass elements 3 do not need to be made of a single piece of material, but can consist of several pieces, such as steel plates, attached together. The number of the spring elements 2 and the mass elements 3 can be chosen according to the need. For instance, the mass damper could comprise only one spring element 2 and a pair of mass elements 3 arranged around the spring element 2. On the other hand, the mass damper could comprise a plurality of mass elements 3 and three or more spring elements 2 arranged between each pair of mass elements 3.

A linear guide 10 is arranged to go through the mass elements 3 for preventing movements of the mass elements 3 in other directions than the vibration direction of the mass damper, but allowing movements in the vibration direction. The mass elements 3 are supported against the linear guide 10 by linear bearings. The linear guide 10 thus supports the mass elements 3, and ensures that the spring elements 2 do not need to carry significant forces in other directions than the vibration direction. The term 'vibration direction' refers here to that direction in which the mass damper is used to reduce vibrations. The linear guide 10 is also arranged to go through the first and second end plates 21, 22 of the frame 1 and through the intersecting stiffening beams 23, 24 at the first end of the mass damper and through the intersecting stiffening beams 25, 26 at the second end of the mass damper. The linear guide 10 can thus be used as a tightening element for the frame 1 of the mass damper.

Figure 4:
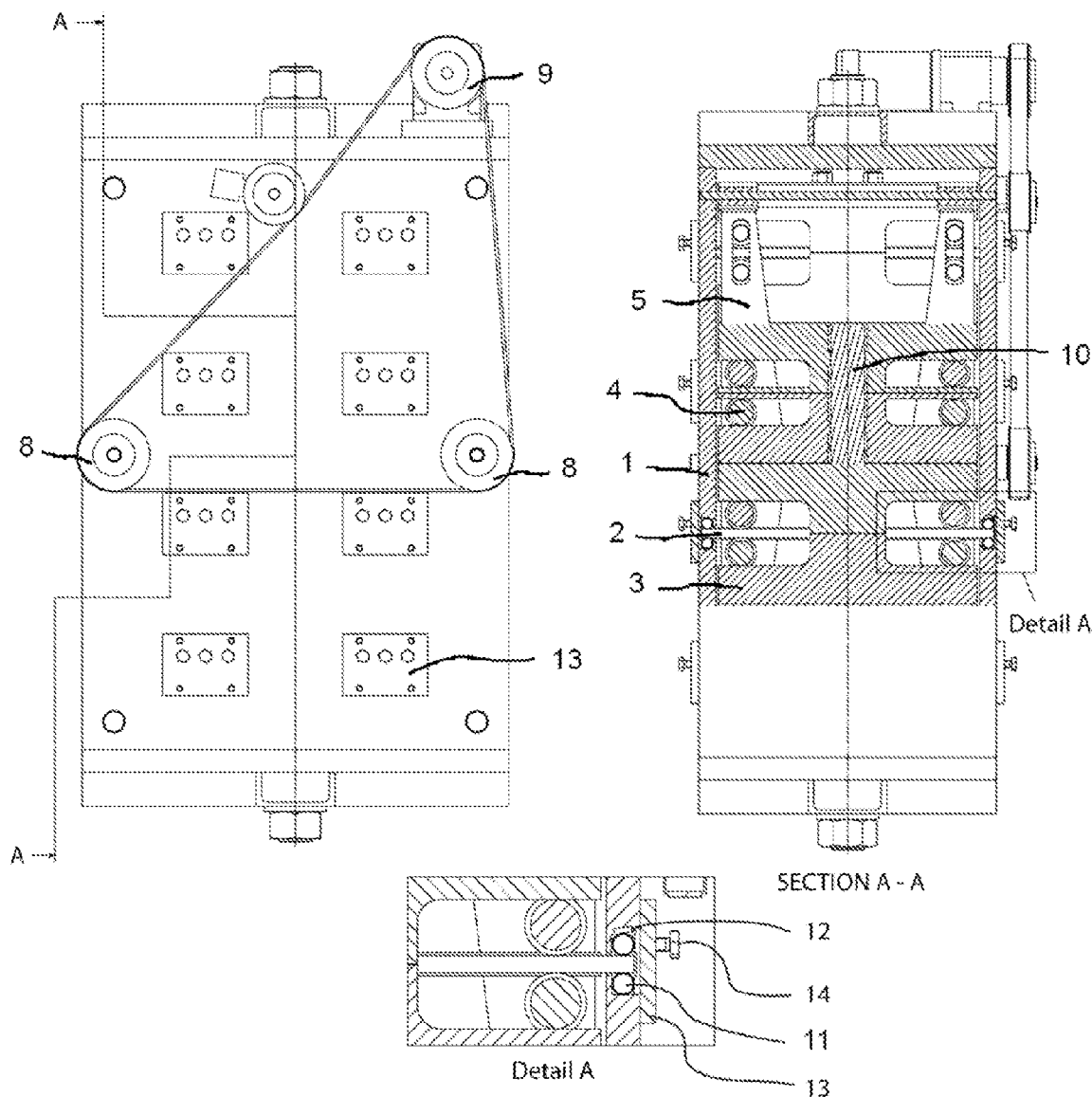
FIG. 4 shows a partially cross-sectional view of the mass damper and a spring support construction according to an embodiment of the invention.

The spring elements 2 are supported by movable spring support elements 4 and second spring support elements 11. Each spring element 2 is supported by four movable spring support elements 4 and four second spring support elements 11. Spring support elements 4, 11 are positioned at both ends and on both sides of the spring elements 2. In FIG. 4 is shown in more detail how the spring elements 2 are attached to the frame 1. The frame 1 is provided with recesses 12. The other edge of the recess 12 is straight, whereas the other edge is sloping so that the recess 12 is narrower on the inner side of the frame 1. Each spring element 2 goes through a recess 12 on both sides of the frame 1, and the second spring support elements 11, which are cylindrical bars in the embodiment shown in the figures, are arranged on both sides of the spring elements 2 in the vibration direction of the mass damper. An adjusting screw 14 goes through a push plate 13 that is bolted to the frame 1. The adjusting screw 14 tightens the second spring support elements 11 against the wedge-shaped recess 12 and enables suitable pre-loading of the second spring support elements 11. Those sides of the frame 1 to which the spring elements 2 are connected are made resilient for allowing movements of the fixing points.

In order to enable adjustment of the tuning frequency of the mass damper, the mass damper is provided with means 5 for moving the movable spring support elements 4. The stiffness of the spring elements 2, and therefore also the tuning frequency of the mass damper, can be adjusted by moving the movable spring support elements 4. When the movable spring support elements 4 are moved away from the second support elements 11, the tuning frequency of the mass damper is changed. The position of the spring support elements 4 is controlled so that suitable tuning frequency is achieved at each operating point of the device of which vibrations need to be dampened. A movable spring support element 4 is shown in more detail in FIG. 3. The movable spring support element 4 comprises a shaft 4a, a bearing roller 4b and an end pivot 4c.

The mass elements 3 are provided with recesses 3a that can accommodate the movable spring support elements 4. The recesses 3a are located at both ends of the mass elements 3. The bearing rollers 4b of the movable spring support elements 4 lie against the spring elements 2 and the surfaces of the recesses 3a. There is a clearance in each parting plane between those mass elements 3 that are around the spring elements 2. In other parting planes the mass elements 3 are arranged directly against each other. Springs 15, such as diaphragm springs, are arranged between those mass elements 3 that are around the spring elements 2. Stud bolts 16 go through the whole mass element stack. Movements of the movable spring support elements 4 are allowed by suitable preloading by the stud bolts 16 and the springs 15 between the mass elements 3. The construction with the clearances between the mass elements 3 and pretensioning by the springs 15 and the stud bolts 16 allows larger manufacturing tolerances, while movements of the movable spring support elements 4 in the longitudinal direction of the spring elements 2 are possible. Even in case there is dirt on the contact surfaces, the risk that the movable spring support elements 4 will be stuck is minimized. The pretensioned stud bolts 16 also prevent the vibrations of the mass element stack. Spring pins 17 are arranged between the mass elements 3 for preventing their horizontal movements in relation to each other.

The means for moving the movable spring support elements 4 comprise moving elements 5 that are parallel to the vibration direction of the mass damper and movable in the longitudinal direction of the spring elements 2. In the embodiment shown in the figures, two moving elements 5 are arranged on each side of the mass damper at both ends of the spring elements 2. Each moving element 5 is provided with apertures 5a, and the end pivots 4c of the movable spring support elements 4 are arranged in the apertures 5a of the moving elements 5. Instead of the apertures 5a, the moving elements 5 could be provided with for instance grooves for accommodating the end pivots 4c. There is a clearance between the aperture 5a of the moving element 5 and the end pivot 4c of the movable spring support element 4. The clearance allows the movements of the mass elements 3, and thus also the movements of the spring elements 2 and the movable spring support elements 4, in relation to the moving element 5 in the vibration direction of the mass damper. When the moving element 5 is moved, also the movable spring support elements 4 move together with the moving element 5. Both ends of the moving elements 5 are supported with transverse linear guides 28, along which the moving elements 5 can move. There are lead screws 6 on both sides of the mass damper for moving the moving elements 5. One end of each lead screw 6 is provided with a pulley 8 that is rotated by a belt 7. The belt 7 is driven by a driving pulley 9 that is attached on the axis of an electric motor 20, which is located on one end of the mass damper.

The mass damper is provided with flanges 18 that can be used to fasten the mass damper to the structure of which vibrations need to be dampened. The mass damper can be installed to work in any direction.

Damping effect is implemented in a known manner by restricting flow inside the casing 29 of the mass damper. The mass damper is filled with damping medium that can be gas or liquid, such as oil. The mass elements 3 that are closest to the ends of the mass damper are provided with plates 27 for preventing damping medium flow past the mass elements 3. The damping medium squeezed by the movement of the mass elements 3 flows through borings in the outermost mass elements 3. The mass damper is provided with a pressure accumulator 19 for allowing expansion of the damping medium and pressurizing of the system.

It will be appreciated by a person skilled in the art that the invention is not limited to the embodiments described above, but may vary within the scope of the appended claims. Many different constructions are possible. For instance, the linear guide guiding the mass elements does not need to go through the mass elements, but one or more guides may be arranged on the sides of the mass damper. In some case, it might even be unnecessary to have any linear guides. This could be the case especially if the dimensions of the mass damper are small. The moving element moving the movable spring support elements may be supported in many ways. It is possible that there are no linear guides but the moving element is supported by two lead screws. Alternatively, the lead screw may be left away and the moving element may be moved by a pneumatic or hydraulic piston. If a lead screw is used, a hydraulic or pneumatic motor may be used instead of an electric motor.

The invention claimed is:

1. A tuned mass damper comprising a frame, at least one bendable spring element being connected from its end to the frame, at least one mass element being connected to the at least one spring element at a distance from the ends of the at least one spring element, a plurality of movable spring support elements, and means for moving the spring support elements in the longitudinal direction of the at least one spring element for adjusting the tuning frequency of the mass damper, wherein that wherein the movable spring support elements are rollers being arranged on both sides of the at least one spring element in the vibration direction of the mass damper.

2. The mass damper according to claim 1, wherein, the means for moving the spring support elements is a moving element that is parallel to the vibration direction of the mass damper and movable in the longitudinal direction of the spring elements.

3. The mass damper according to claim 2, wherein the moving element comprises apertures being arranged around the ends of the movable spring support elements.

4. The mass damper according to claim 2, wherein the moving element is attached to a lead screw and that the mass damper comprises means for rotating the lead screw.

5. The mass damper according to claim 1, wherein the spring elements are connected to the frame with second spring support elements located on both sides of the spring elements in the vibration direction of the mass damper and being wedged between the spring element and a recess in the frame.

6. The mass damper according to claim 1, wherein the parts of the frame parallel to the vibration direction of the mass damper are resilient for allowing displacement of the fixing points of the spring elements.

7. The mass damper according to claim 1, wherein the mass elements are provided with recesses for accommodating the movable spring support elements.

8. The mass damper according to claim 1, wherein the mass elements are connected to each other with at least one stud bolt.

9. The mass damper according to claim 1, wherein spring pins are arranged between the mass elements for preventing movements of the mass elements in relation to each other in the longitudinal direction of the spring elements.

10. The mass damper according to claim 1, wherein springs are arranged between the mass elements that are around the spring elements.

11. The mass damper according to claim 1, wherein the mass damper comprises at least one linear guide supporting the mass elements and allowing movements of the mass elements in the vibration direction of the mass damper.

12. The mass damper according to claim 11, wherein the linear guide is used to tighten the frame of the mass damper.

\* \* \* \* \*